UNITED STATES PATENT OFFICE.

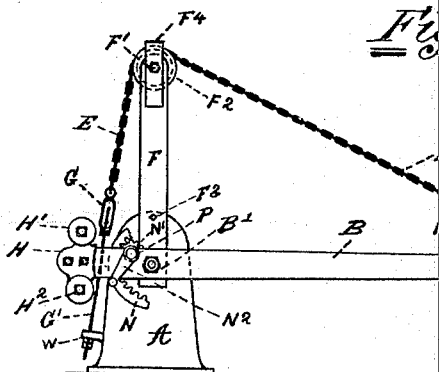

BENJAMIN F. TEAL, OF PATERSON, NEW JERSEY.

GATE FOR RAILROAD-CROSSINGS.

SPECIFICATION forming part of Letters Patent No. 496,960, dated May 9, 1893.

Application filed July 22, 1892. Serial No. 440,919. (No model.)

*To all whom it may concern:*

Be it known that I, BENJAMIN F. TEAL, a citizen of the United States, residing in the city of Paterson, county of Passaic, and State of New Jersey, have invented a new and useful Improvement in Gates for Railroad and other Crossings, and especially for wide crossings, where the movable arms have to extend a considerable distance from the operating-post and have at the same time to be raised and lowered within a limited height, so as to clear telegraph-wires, conducting wires for electric railroads, &c., of which the following is a specification.

The object of my invention is to provide a simple, durable and efficient apparatus for the above purposes to consist of a jointed or double boom, one length being attached to a pivot connected with the operating mechanism in connection with a post, or stand, the other jointed by a pivotal hinge to the first length at its outer end, and secured in its position in such a manner that a firm and efficient barrier is produced extending when lowered across a wide avenue or road, and when raised not exceeding in height the length of the first arm or section. I accomplish these purposes by the device more fully described in the following specification and illustrated in the accompanying drawings in which—

Figure 1 is a front elevation of my newly invented crossing gate showing the arm or boom lowered guarding a crossing. Fig. 2 is an end view of the same. Fig. 3 is an end view showing the arms raised and the crossing open. Fig. 4 is a front view of the gate during the operation of raising the arms or booms.

Similar letters have reference to similar parts.

I will now proceed to describe more fully the construction of my newly invented gate for railroad and other crossings.

A in Fig. 1 represents a cast iron stand or box to which are pivoted, by the shaft $B'$, the arms $B^2 B^{21}$ of the main boom B which are connected rigidly by cross braces $B^3$ in the usual manner. The inner ends of the arms $B^2 B^{21}$ are provided with counterbalance weights $H'$ located on a suitable end casting H, of a number and weight sufficient to balance the weight of the parts of the device extended beyond the pivot $B'$ on the outer side. The weights $H'$ are secured by pins or bolts $H^2$. The main boom or arm is operated by a segment arc N provided with teeth formed to engage with similar teeth formed on a pinion $N'$ which is journaled on a stud P. The segmental arm N is attached by suitable bolts to the stand A and the stud P is secured to the arm $B^2$ or $B^{21}$. Forming a part of the pinion $N'$ is a lever or arm $N^2$ to the outer end of which an operating handle $N^3$ is secured by a rivet or screw. The pinion $N'$ is secured on the stud P by a nut, split key or other suitable device to hold the same loosely in contact with the segment toothed arm N. The outer end of the boom B is provided with a pivotal bolt $C'$ upon which the end of the extension boom C is pivoted and held in secure embrace by a suitable split pin, key or nut. The boom C is constructed in a similar manner to the main arm or boom, having two side rails connected together by cross bracing in the usual manner, the ends being clamped together by a bolt or rivet. Pivoted upon the main boom, near its extremity where the extension boom is hinged or jointed, by a suitable pivot bolt or pin $D^3$, is a grooved wheel $D^5$ formed purposely to receive the chain E when the gate is lowered or raised. To the same pivot bolt $D^3$ are secured the forked arms $D'$ of the supporting bracket and guide D. The wheel $D^5$ is located between the forked arms $D'$ and moves freely upon the pin $D^3$ as do the arms themselves. At the upper portion of the bracket and guide D the forked arms are welded together forming the eye $D^2$ to which the flexible chain E is secured by a suitable clevis or pin. The bracket D is again forked beyond the welded eye so as to form two brace rods $D''$ one of which is secured to each side rail of the extension boom C by suitable screws $D^4$. Secured by suitable bolts $F^3$ to each side of the post A are vertical projecting arms F F which are connected together at their upper ends by the pivot bolt $F'$ and cover band $F^4$. A wheel $F^2$ is loosely located on the bolt $F'$ between the arms F F, the periphery of which like that of the wheel $D^5$, is grooved to receive the chain E. One end of the chain E is attached to the forked bracket D and is carried over the pulley wheel $F^2$ and downward to a rod $G'$ to which it is secured by a turnbuckle G. The rod G' is screwed at one end, to enter, and engage the nut of the turnbuckle G a sufficient length for the necessary adjustment, and at the other extremity is provided with a screwed end and fitted with a lock or double nut by which it is secured loosely in a hole provided to receive it in a lug W bolted to or screwed into the stand A at its back near the lower portion as shown in Fig. 1. At a suitable distance from the end of the main boom B and pivoted upon the bolt K' is a leg K formed preferably of gas tubing for supporting the gate or boom when lowered which swings into the space between the arms $B^2$ $B^{21}$ when the gate is raised in a similar manner to those in use at present.

Having described the construction, I will now proceed to describe the use and operation of my newly invented gate for railroad or other crossings.

The booms B and C being lowered in position as in Fig. 1, force applied to the handle $N^3$ rotates the pinion N' which engages the segment arm N secured to the stand A and raises the outer end of boom B to which the boom C is pivoted by the pivot $D^3$; but the outer end of the extension arm or boom C does not rise with this movement. Continued motion of the pinion N' engaging the segment N raises the main boom B at its outer end and the extension boom C at its inner end to their highest positions, the outer end of the boom C traveling inward toward the stand A in a horizontal path or plane, and the wheel $D^5$ when the boom B is raised a certain height forming a fulcrum for the chain E to rest upon. The end of the boom C finally falls between the arms $B^2$ $B^{21}$ of the main boom B which are formed so as to receive it; the support rod K also falling inward in a similar manner. The adjustment of the chain E by the turnbuckle G permits the regulation of the level of the outer or extension boom by tightening the chain E to raise and slacking the chain E to depress. It is obvious that the outer end of the extension arm or boom C being heavier than the inner end where it is pivoted to the main boom B, the chain E is held taut during the operation of raising and when it is resting on the wheel $D^5$. In the operation of lowering, the handle with pinion N' is turned in the direction opposite to that used for raising. The segment N engaged by pinion N' lowers the boom B. The chain E held by the turnbuckle G and rod G' secured to the stud or lug W on the stand A controls the end of the extension boom C by the bracket and guide arm D and forces the outer end of the extension arm C to travel outward as the main boom B descends, the chain E riding on the wheel $D^5$ as a pivot until the gate is nearly lowered, when the chain E leaves the wheel $D^5$ and raises the end of the boom C to a level with the rest of the gate and in line with it. During the operation of lowering the pivoted leg K falls into a vertical position and forms a support for the center of the gate in the usual manner. The mechanism of the moving device is to be provided with the usual gong or other sounding device to be used for warning when lowering and the arms B and C provided with a bracket or hook to which a signal lamp may be secured or suspended or a flag displayed as in general use.

The booms B and C are preferably constructed of light yet strong strips of wood firmly braced and secured together but they may be constructed of iron or steel of light and suitable sectional shape.

As is obvious the same device will answer for the uses of a crane or derrick and I apply it to that use also.

Having described the construction and operation of my newly-invented gate for railroad or other crossings, what I claim as new, and desire to secure by Letters Patent, is as follows:

The combination with a stand A of a main boom B pivoted to the stand, a short distance from one end of said boom, an extension boom C pivoted at one end to the longer end of the pivoted main boom, an arm D' pivoted on the longer end of the main boom, a fixed arm D on the pivoted end of the extension boom, vertically upward projecting arms F on the stand, a pulley $F^2$ on upper ends of said arms F, a chain E, passing over said pulley $F^2$, and having one end connected with the pivoted arm D' on the swinging longer end of the main boom and the fixed arm D on the pivoted end of the extension boom and a pulley $D^5$ on the swinging longer end of the main boom, substantially as set forth.

BENJAMIN F. TEAL.

Witnesses:
WILLIAM J. McCOLLOM,
WM. M. DREW.